United States Patent [19]
Waterhouse et al.

[11] Patent Number: 5,374,815
[45] Date of Patent: Dec. 20, 1994

[54] TECHNIQUE FOR LOCATING ELECTRONIC LABELS IN AN ELECTRONIC PRICE DISPLAY SYSTEM

[75] Inventors: Paul Waterhouse, Copetown; John Stevens, Streetsville, both of Canada

[73] Assignee: Electronic Retailing Systems Int'l Inc., Wilton, Conn.

[21] Appl. No.: 31,580

[22] Filed: Mar. 15, 1993

[51] Int. Cl.[5] .................. G06K 15/00; G06F 15/24
[52] U.S. Cl. ................................. 235/383; 235/385
[58] Field of Search ................ 235/383, 385, 441; 395/114; 340/825.35; 345/2, 3; 439/589, 590; 211/184

[56] References Cited

U.S. PATENT DOCUMENTS

| | | | |
|---|---|---|---|
| 4,002,886 | 1/1977 | Sundelin | 235/383 |
| 4,139,149 | 2/1979 | Crepean et al. | 235/383 |
| 4,346,453 | 8/1982 | Drapeau et al. | 364/900 |
| 4,500,880 | 2/1985 | Gromersail et al. | 235/454 X |
| 4,654,514 | 3/1987 | Watson et al. | 235/385 |
| 4,766,295 | 8/1988 | Davis et al. | 235/383 |
| 4,783,740 | 11/1988 | Ishizawa et al. | 364/403 |
| 4,821,291 | 4/1989 | Stevens et al. | 375/37 |
| 4,888,709 | 12/1989 | Revesz et al. | 364/518 |
| 4,962,466 | 10/1990 | Revesz et al. | 364/518 |
| 5,019,811 | 5/1991 | Olsson et al. | 340/825.35 X |
| 5,111,196 | 5/1992 | Hunt | 235/383 X |
| 5,160,920 | 11/1992 | Harris | 340/765 |
| 5,161,704 | 11/1992 | Valiulis | 211/184 |
| 5,172,314 | 12/1992 | Poland et al. | 364/401 |
| 5,198,644 | 3/1993 | Pfeiffer et al. | 235/383 |
| 5,241,467 | 8/1993 | Failing et al. | 235/383 X |
| 5,241,657 | 8/1993 | Fine et al. | 395/162 |
| 5,245,534 | 9/1993 | Waterhouse et al. | 340/825.35 X |

FOREIGN PATENT DOCUMENTS

| | | | |
|---|---|---|---|
| 299355 | 1/1989 | European Pat. Off. | |
| 3249003 | 11/1991 | Japan | 235/385 |
| 886773 | 9/1988 | United Kingdom | 340/825.35 |
| 9305456 | 3/1993 | WIPO | |
| 9305475 | 3/1993 | WIPO | |

OTHER PUBLICATIONS

IBM Technical Disclosure Bulletin vol. 34 No. 1 Jun. 1991.

*Primary Examiner*—Donald Hajec
*Assistant Examiner*—Jeffrey R. Filipek
*Attorney, Agent, or Firm*—Oppedahl & Larson

[57] ABSTRACT

In a system for displaying prices in a retail store, improved rail arrangements are disclosed to permit improved accuracy in confirming the physical location of an improved display device on one such rail arrangement. A response from the device to a host, or central computer, indicates a particular position of the device on the rail arrangement.

32 Claims, 5 Drawing Sheets

| ZONES | BIT PATTERNS |
|---|---|
| 1 | 1110 |
| 2 | 1101 |
| 3 | 1010 |
| 4 | 0101 |
| 5 | 1011 |
| 6 | 0110 |
| 7 | 1100 |
| 8 | 1001 |
| 9 | 0010 |
| 10 | 0100 |
| 11 | 1000 |
| 12 | 0001 |
| 13 | 0011 |
| 14 | 0111 |
| 15 | 1111 |

TECHNIQUE FOR LOCATING ELECTRONIC LABELS IN AN ELECTRONIC PRICE DISPLAY SYSTEM

TECHNICAL FIELD

The present invention relates to electronic labels and particularly to a technique for detecting displacement of and/or locating such labels in an electronic price display system.

BACKGROUND OF INVENTION

Much attention has been given in recent years to systems used in retail stores for displaying goods prices. While manual marking of the prices at the location of the goods, or on the goods themselves, is conventional, attempts have been made to use electronic means, instead, for displaying the prices at the goods location.

Some electronic price display systems have been proposed to employ electronic labels or modules, each typically having a liquid crystal display, for displaying the prices. Buses for power and data are used in such systems to connect many thousands of such labels to a central computer for the latter to communicate with particular ones of the labels to, for example, request changes in their displayed prices. To this end, the labels are equipped with connectors so that they can be snapped onto one of many locations along rails which include the buses and which run along the edges of the store shelves. The connectors also provide the labels with electrical connections to the central computer through the buses.

Experience has shown that physical placement of products within a store has, oftentimes, enormous influence on the sales of the products. Factors including shelf height and the number of product facings along a shelf can be of great significance to store planners. Thus, it is important for a store planner to ensure that the "plan-o-gram" of the store, which is a plan showing product locations on shelves, is faithfully adhered to. However, deviations from the plan-o-gram could often result from accidental or intentional misplacement of the labels by store personnel, customers or others.

A scheme has been proposed for detecting such misplacement by monitoring power outage of the labels, assuming that a misplaced label has been removed from its power before relocated. Undesirably, such a proposed scheme is not capable of detecting displacement of a label along the rail without interrupting its power. A fortiori, it is not capable of determining the location of the displaced label.

SUMMARY OF THE INVENTION

The invention overcomes the prior art limitation by including an interface along a rail and a plurality of terminals on a label. This interface has a plurality of electrical contacts for making electrical connection with the label through a combination of its terminals. These electrical contacts are unevenly spaced and may be in different sizes so that the combination of terminals electrically connecting the label to the interface changes when the label displaces by more than a predetermined distance along the rail.

In response to a poll from the central computer for determining any displacement of the label, the latter generates a signal indicative of the combination of terminals electrically connected to the interface. Based on this signal and knowledge of the pattern of the electrical contacts along the interface, the central computer can effectively determine the location of the label on the rail and detect any displacement of same.

BRIEF DESCRIPTION OF THE DRAWING

In the drawing.

Throughout the figures of the drawing, the same reference numerals and characters are used to denote like features, elements, components or portions of the illustrative embodiments.

DETAILED DESCRIPTION

Figure 1:
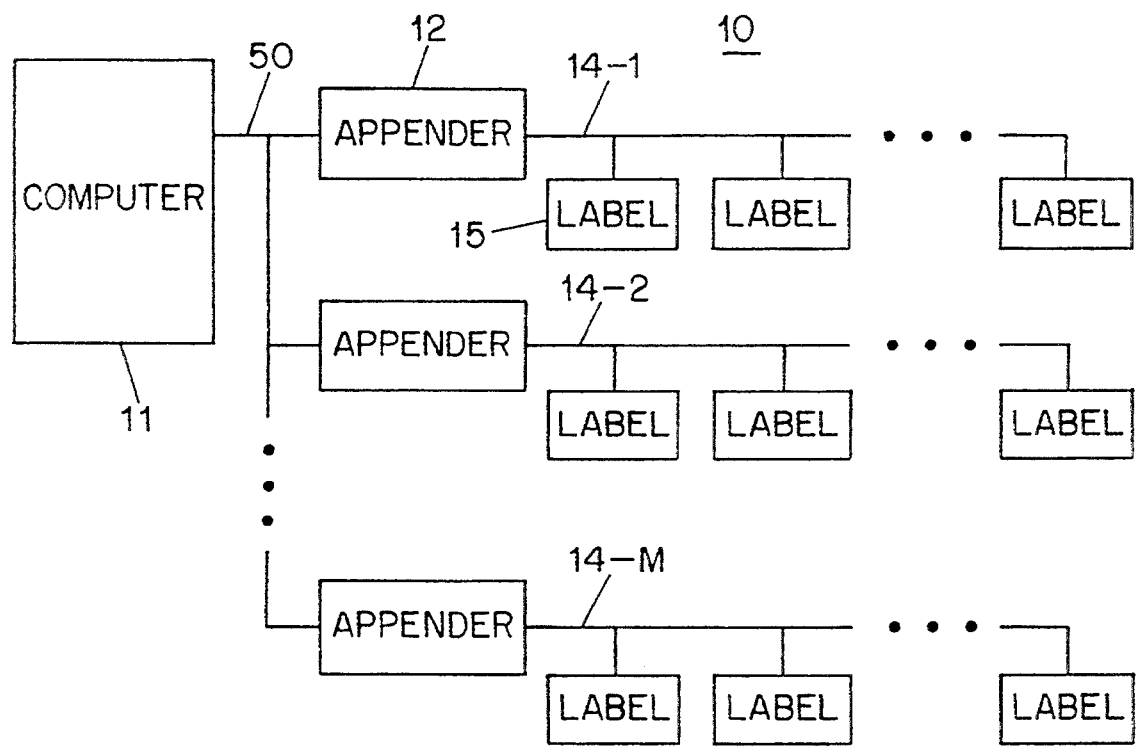
FIG. 1 is a block diagram of an electronic price display system embodying the principles of the invention.

FIG. 1 illustrates an electronic price display system 10 embodying the principles of the invention. System 10 may be employed in a retail store where goods for sale are placed on shelves. In FIG. 1, computer 11, which may be a conventional microcomputer with appropriate bus interface circuitry, is electrically connected to buses 14-1, 14-2 . . . , and 14-M in a multidrop arrangement, where M is an integer whose value is determined by a store planner. Each of these buses runs along the rail of a store shelf in the retail store.

As shown in FIG. 1, a myriad of labels are electrically connected to the buses. One such label is label 15 which is electrically connected to bus 14-1 in a manner to be described. In this illustrative arrangement, computer 11 can communicate with the labels through their respective buses. In addition, a multiplicity of appenders are electrically connected between computer 11 and the labels. Specifically, one appender is connected to each bus between computer 11 and the labels of that bus. It should be pointed out that all of the labels are structurally identical to one another, differing only in their bus addresses which are pre-assigned thereto for identification purposes. Similarly, all of the appenders are structurally identical to one another, differing only in their respective bus addresses. Bus 50 provides a bidirectional communication path between computer 11, also sometimes called a host, and an appender. Illustratively, appender 12 is electrically connected in such a manner to bus 50. In one embodiment there is an appender for each four-foot section of shelf rail in the store. For the purpose of the present discussion, it suffices to know that the function of an appender in system 10 is to append its bus address to a message to computer 11 sent by a label on the same bus as that appender. The appended bus address enables computer 11 to identify which bus the label that sent the message is on.

Figure 2:
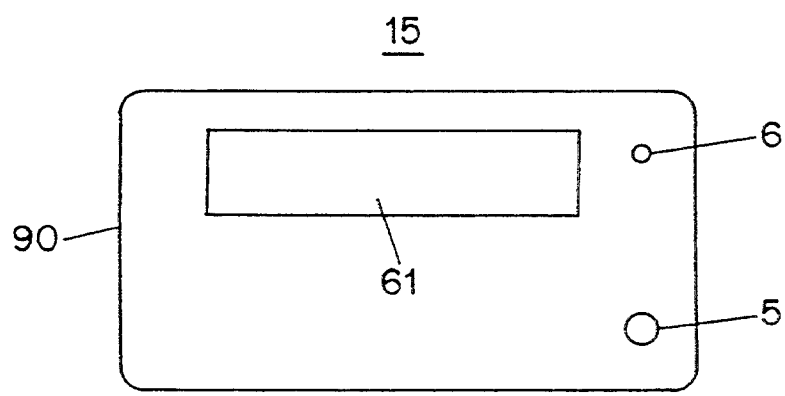
FIG. 2 is a front view of a label used in the system of FIG. 1.

FIG. 2 provides the front view of label 15. It comprises display 61 which is, for example, of liquid crystal type, light emitting diode (LED) 6 which is controllable by the label, and push-button 5 whose function is described hereinbelow. In addition, case 90 provides mechanical interconnection of the various parts of label 15.

Figure 3:
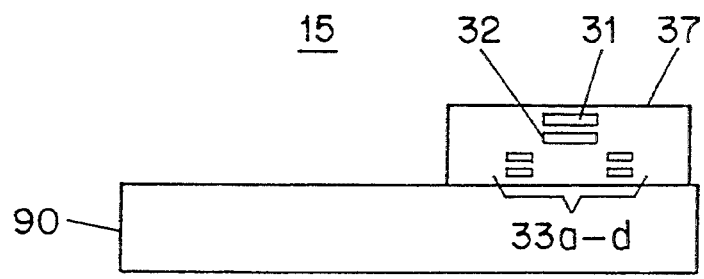
FIG. 3 is a top view of a label used in the system of FIG. 1.

FIG. 3 provides the top view of label 15. As shown in FIG. 3, label 15 has connector 37, whereby the label can be mechanically snapped onto one of the many locations (not shown in FIG. 3) on the rail to be electrically connected to bus 14-1. On connector 37, springy contacts 31 and 32, and four individual terminals 33a through 33d permit reliable electrical connection of label 15 of FIGS. 2 and 3 to the bus.

Figure 4:
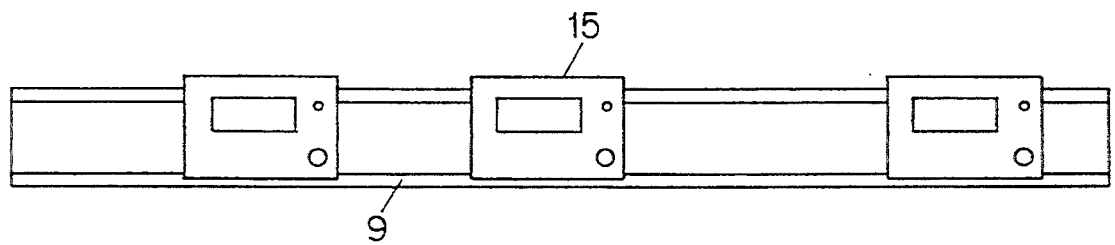
FIG. 4 is a front view of a portion of the system of FIG. 1, including a shelf rail and a plurality of labels in accordance with the invention.

FIG. 4 illustrates a physical disposition of label 15 and other labels on bus 14-1 on rail 9. Thus, label 15 may be used to display the prices of goods close thereto, which prices are communicated to it from computer 11 (not shown in FIG. 4).

Figure 5:
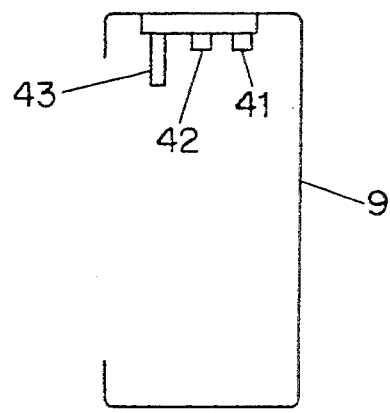
FIG. 5 is a cross-section of the shelf rail of FIG. 4.

FIG. 5 shows a cross-section of rail 9. Conductor 41, conductor 42 and etched board 43, which has on its surface a metallic strip (not shown in FIG. 5) in accordance with the invention, run along the length of rail 9 and are positioned so as to be respectively connected to contact 31, contact 32 and terminals 33a–33d of label 15 of FIG. 3. Etched board 43 is a printed circuit board of conventional mechanical construction having, on each of its two sides, a metallic surface which may be etched in a standard way to realize metallic strips of different patterns. The patterns of the metallic strips used in the present embodiment will be described hereinbelow.

Figure 6:
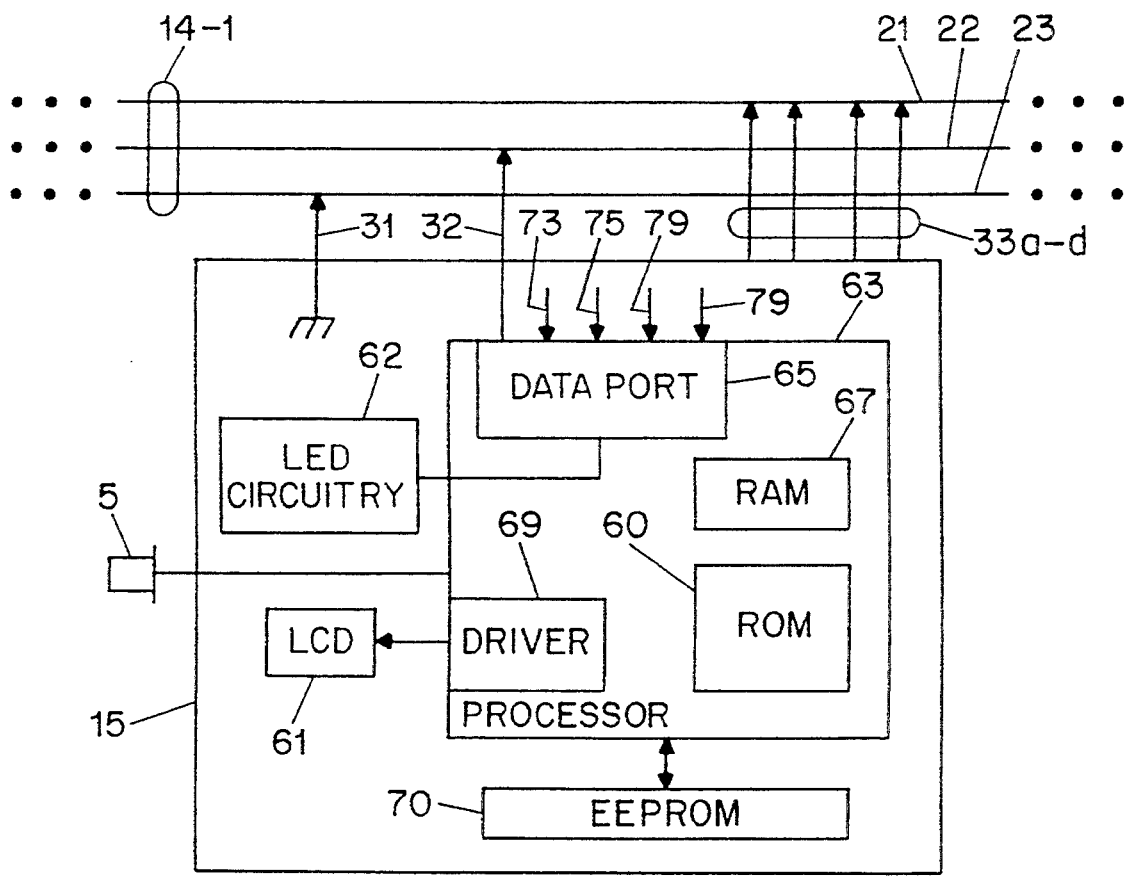
FIG. 6 is a block diagram showing detailed connection between a label of FIGS. 2 and 3 and a bus in the system of FIG. 1.

FIG. 6 shows detailed connections of label 15 to bus 14-1. Illustratively, bus 14-1 comprises power line 21, data wire 22 and ground wire 23 which are, respectively, physically realized as a metallic strip on etched board 43 to be described, conductor 42 and conductor 41 of rail 9 of FIG. 5. Specifically, line 21 transports electrical power from computer 11 (not shown in FIG. 6) to label 15 and other labels on bus 14-1; wire 22 transports data between computer 11 and same; and wire 23 provides a ground or common line between computer 11 and the same.

Central to label 15 is processor 63 which, in this illustrative embodiment, comprises microprocessor LC5851N manufactured by Sanyo Electric Co., Ltd. Processor 63 includes, inter alia: data port 65, read only memory (ROM) 60, random access memory (RAM) 67, and liquid crystal display (LCD) driver 69. A full description of the functions and specifications of the microprocessor LC5851N may be found in a manual No. 3341, which is made available by Sanyo Electric Co., Ltd. Semiconductor Overseas Marketing Division, and which is hereby incorporated by reference.

ROM 60, programmed permanently at the time of manufacture, contains a monitor program which orchestrates the basic operation of label 15 to perform different functions required thereof. One of these functions is to communicate messages with computer 11 asynchronously through springy contact 32. To this end, each message communicated between computer 11 and label 15 is sent to or retrieved from RAM 67 through the data port 65. The processor 63 properly formats the output messages in a standard serial protocol and recognizes the input messages in that same protocol.

EEPROM 70, also connected with processor 63, contains the identification of label 15 which represents its unique address on the bus in electronic price display system 10. EEPROM 70 preferably is a serial-in serial-out shift register memory, offering the advantage of a small pin count in its connection with processor 63. The unique identification is programmed by a several step process—the address is accumulated in RAM 67, and then stored in EEPROM 70, in response to a specific instruction received over the bus. It is anticipated that for a given label 15, the specific instruction would be given only once, so that the unique identification remains unchanged during the life of the label. Alternatively, the unique identification could be store in some other form—jumpers in the printed wiring board of the label, or masked contents of ROM 60 being two examples.

While EEPROM 70 is shown as a separate piece part from processor 63, one skilled in the art will appreciate that one could, without departing from the scope of the invention, employ a processor with built-in EEPROM instead. Other types of memory could be used instead of those described above. A battery-back RAM could be used, for example, to store some or all of what is described above as stored in EEPROM. The processor's stored program could be in EEPROM, EPROM, OTPROM, or battery-backed RAM, for example, rather than the ROM described above.

The messages from computer 11 through data wire 22 to processor 63 may contain price information such as the prices of goods, price per unit of goods, etc. Upon receiving such messages in RAM 67, the program therein extracts the price information, stores it in EEPROM 70, and provides it to LCD driver 60. This driver, in a standard way, provides electrode voltage levels so that the price or other information is displayed by LCD 61 which is of convention design.

As mentioned before, power line 21 provides power to label 15 through terminals 33a–33d. The power is used, for example, to power LED 6 (not shown in FIG. 6) supported by conventional LED circuitry 62. Pushbutton 5 is a conventional switch for allowing a customer to change the displayed information from, for example, the price of the goods to their unit price. Pushbutton 5 when pushed creates an electrical signal level to processor 63. The program within ROM 60 polls the button periodically for detecting any such pressing of the button. Upon detection of the pressing of the button 5, the program retrieves alternative price information from EEPROM 70 or RAM 67 to be displayed by LCD 61. FIG. 6 also shows the connection of ground wire 23 to label 15 through contact 31.

Experience has shown that, in a retail store, physical placement of products may have enormous influence on the sales of the products. Factors including shelf height for a product, and the number of product facings along a shelf can be of great significance to store planners. Thus, it is important for a store planner to ensure that a "plan-o-gram" of the store, which is a plan showing product locations on shelves, is faithfully followed. However, deviations from the plan-o-gram could often result from accidental or intentional misplacement of the labels by store personnel or customers. Thus, it is desirable to remedy the misplacement or relocation of the labels as expeditiously as possible.

By appending its bus address to messages from a label to computer 11, the above-described appender can assist computer 11 to detect relocation of the label when such relocation is from the service area of one appender to that of another. Such detection is achieved by monitoring any change in the appended bus addresses of the messages sent out by the label. However, using appenders by themselves without the use of rail patterns described herein, computer 11 will not detect displacement of a label if the displacement happens to remain within the physical region served by a given appender. That is, lateral displacement of a label along a rail will not give rise to detection by computer 11 because the appended bus address will remain unchanged. A fortiori, the location of the displaced label on the rail cannot be determined by computer 11.

Figures 7, 8B:
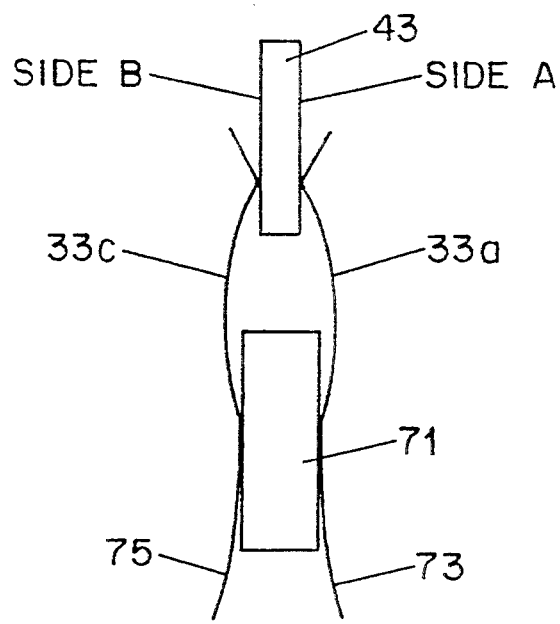
FIG. 7 shows in detail the connection between a pair of terminals extending from the label of FIGS. 2 and 3 and an interface of the bus of FIG. 6.
FIG. 8B tabulates various bit patterns generated by the label of FIGS. 2 and 3 corresponding to different zones of the interface of FIG. 8A.

In accordance with the invention, in order to detect the lateral displacement of label 15 along rail 9 or to determine the lateral position of the label, power line 21 is designed in such a way that all or a subset of terminals 33a through 33d of the label are in electrical contact therewith along the rail. FIG. 7 shows terminals 33a and 33c forming a terminal-pair to provide a SIM type contact for connecting label 15 to board 43 from its side A and side B, respectively. As shown in FIG. 7, terminal-pair 33a and 33c securely clasps onto board 43 at one end and is permanently fixed onto non-conductor 71 at the other end. Non-conductor 71 which resides within connector 37 (not shown in FIG. 7) has wires 73 and 75 thereon electrically connecting terminals 33a and 33c, respectively, to label 15. With this arrangement, terminals 33a and 33c conduct electrical power, if any, to label 15 through the respective wires. Similarly, terminals 33b and 33d (not shown in FIG. 7) together form another terminal-pair to provide another SIM type contact extending from non-conductor 71 for clasping onto board 43 from its sides A and B, respectively.

Figure 8A:
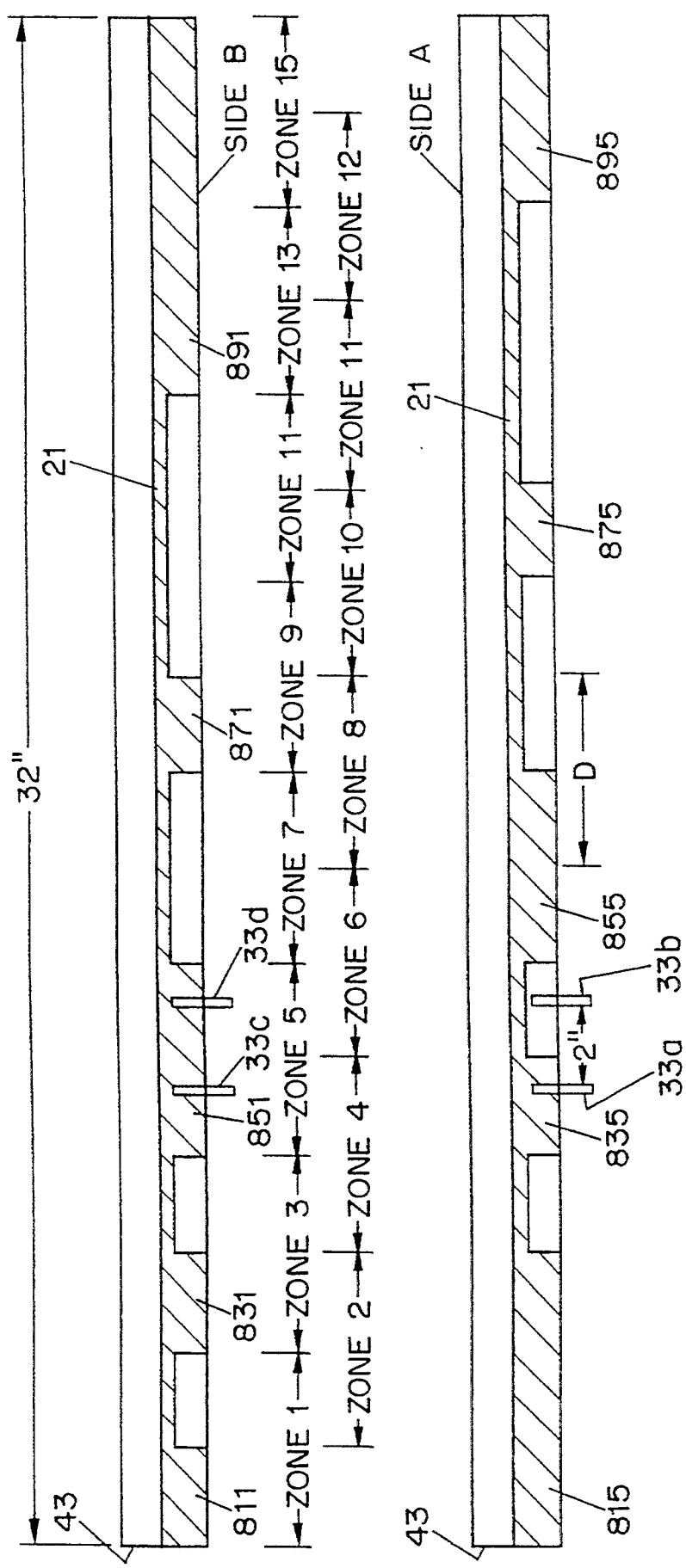
FIG. 8A shows in detail the interface of FIG. 7 and the detailed connection between the terminals of the label of FIGS. 2 and 3 and such an interface.

As mentioned before, line 21 is physically realized as metallic strips of particular patterns on etched board 43. FIG. 8A illustrates such metallic strips on side A and side B of etched board 43. As shown in FIG. 8A, the shaded part of each side of board 43 comprises a metallic strip and is conductive of power. On the other hand, the unshaded part of board 43 is non-conductive. The metallic strips have a plurality of metallic projections or contacts, namely, metallic contacts 811, 815, 831, 835, 851, 855, 871, 875, 891 and 895, for interfacing line 21 with terminals 33a through 33d. It is noteworthy that the sizes of these metallic contacts are not fixed.

In this illustrative embodiment, each metallic strip is 32 inches long. Within the metallic strips, metallic contact 811 is two inches long, metallic contact 815 six inches long, contact 831 two inches long, contact 835 two inches long, contact 851 four inches long, contact 855 four inches long, contact 871 two inches long, contact 875 two inches long, contact 891 eight inches long, and contact 895 four inches long. Terminal-pair 33a and 33c and terminal-pair 33b and 33d are separated by a distance of two inches. (It should be noted at this point that, throughout this disclosure, the distance between any two items is measured from the center of an item to that of the other.) All or a subset of terminals 33a-33d come in contact with the metallic contacts of line 21 and obtain power or a high voltage level therefrom. In this instance, all of these terminals except terminal 33b touch part of some metallic contacts and experience a high voltage.

A resident program in EEPROM 70 of label 15 is capable of generating a binary bit pattern of 1's and 0's corresponding to the respective voltage levels of terminals 33a through 33d. For example, label 15 is programmed to translate a high voltage from a terminal to a binary bit 1, and an absence of such a high voltage to a binary bit 0. Thus, in this instance, the resident program generates a binary bit pattern 1011 corresponding to terminals 33a through 33d contacting line 21 in the above-described manner.

In accordance with the invention, line 21 is designed in such a way that terminals 33a-33d when placed within various zones or ranges on board 43 cause different bit patterns to be generated by the resident program within the label. To this end, the distance between any two neighboring metallic contacts on line 21 which is generically denoted D is made unequal (i.e., the metallic contacts on line 21 are unevenly spaced). In fact, D varies in such a way that a different bit pattern is guaranteed to engender whenever the set of terminals 33a-33d displaces more than a predetermined distance. With the particular patterns of the metallic strips as in FIG. 8A, fifteen zones are identified on board 43. These zones are denoted zones 1 through 15 in FIG. 8A and overlap one another. In this illustrative embodiment, each individual zone is four inches long and associated with a different bit pattern. When the set of terminals 33a-33d is completely placed within a particular zone, it causes the bit pattern associated therewith to be generated. It can be shown that, here, any displacement of the terminal set 33a-33d of more than two inches necessarily translates it into a different zone corresponding to a different bit pattern.

FIG. 8B tabulates various bit patterns corresponding to zones 1 through 15 of FIG. 8A. For example, as in this instance, terminals 33a-33d are placed completely within zone 5 which corresponds to the bit pattern 1011 as mentioned before. It is noteworthy that the bit pattern 0000 is not in use in the present embodiment since at least one of terminals 33a-33d is required to be in electrical contact with line 21 to obtain power for label 15.

Based on the discussion heretofore, it will be appreciated that a person skilled in the art can vary the size of the above-described zones by using a different number of terminals on label 15, which number determines the number of different bit patterns or distinct zones on rail 9. Moreover, the person skilled in the art can also proportionally enlarge or reduce the size of the illustrative metallic strips to satisfy his/her particular size requirements.

Computer 11 contains a look-up table akin to a plan-o-gram which comprises a list of individual zones on each rail identified by the 4-bit patterns which are associated with various labels identified by their bus addresses in the retail store. In addition, the look-up table also contains information about the locations of the respective zones. This information comprises a compilation of distances measured from a reference point of the rail, for example, an end of the rail, to the beginnings and ends of the respective zones. Among other things, computer 11 periodically polls the labels in system 10 for the 4-bit patterns to determine whether the labels are indeed in their supposed zones. Referring back to FIG. 6, for example, in response, label 15 generates a 4-bit pattern corresponding to the respective voltage levels of terminals 33a–33d contacting board 43, in accordance with the aforementioned resident program in EEPROM 70. This 4-bit pattern along with the bus address of label 15 is transmitted thereby in an appropriate protocol to computer 11 through data port 65 via data wire 22. Continuing the example, upon receiving the 4-bit pattern and the bus address from label 15, computer 11 checks the received information against the look-up table. If computer 11 determines that the received 4-bit pattern should not be associated with the bus address of label 15, it assumes that label 15 has been displaced from its supposed zone. As a result, computer 11 issues a warning about the displacement. Such a warning, for example, may be effected by having computer 11 return a command to label 15 via data wire 22, causing LED 6 on label 15 to flash so as to alert the store personnel to correct any unwanted displacement. Alternatively, computer 11 may generate an exception report in a print form identifying the displaced label, and the location of the range which it is in based on the received 4-bit pattern.

Figure 9:
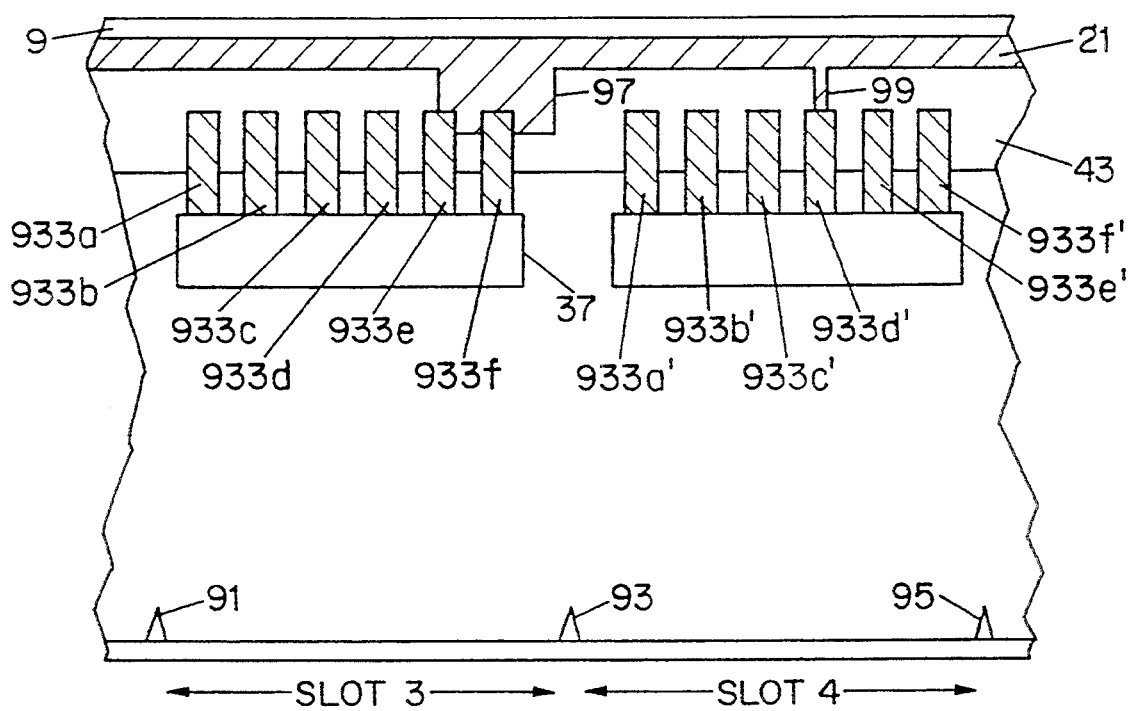
FIG. 9 illustrates a second rail arrangement in accordance with the invention wherein the rail is partitioned into a plurality of slots and only one label is allowed to be placed within each slot.

A second embodiment involving the use of mechanical stoppers on rail 9 will now be described. In this embodiment, the mechanical stoppers are employed to partition rail 9 into a multiplicity of slots. FIG. 9 shows a section of rail 9 wherein mechanical stoppers 91 and 93 delimit a slot numerically denoted 3, and stoppers 93 and 95 delimit another slot numerically denoted 4. Unlike the above-described zones, the slots here do not overlap one another. Also unlike the previous embodiment, only one side of board 43 in FIG. 9 has a metallic strip of a particular pattern and the other side thereof is completely nonconductive. There are six, rather then four as in the previous embodiment, terminals extending from connector 37 of label 15. Each terminal has a SIM type contact for clasping onto board 43. Thus, except for the terminal arrangement, label 15 in the previous embodiment is virtually identical in structure to label 15 in the present embodiment.

Although FIG. 9 shows only slot 3 and slot 4 of rail 9, in fact, rail 9 can have as many as 63 slots in the present embodiment. Each slot is associated with a different one of 6-bit patterns 000001 through 111111 corresponding to the respective voltage levels of terminals 933a through 933f. Illustratively, slot 3 is associated with the bit pattern 000011 (which equals 3 in decimal), slot 4 is associated with the bit pattern 000100 (which equals 4 in decimal), and so on and so forth. In accordance with the invention, each slot is allowed to accommodate only one label. Moreover, line 21 is designed in such a way that the 6-bit pattern generated by a label within a particular slot coincides with the bit-pattern associated with that particular slot. Thus, as shown in FIG. 9, when terminals 933a–933f of label 15 come into contact with etched board 43 within slot 3, a bit pattern of 000011 would be generated by label 15, stemming from the present arrangement wherein only terminals 933e and 933f can come in electrical contact with line 21 through metallic contact 97 within slot 3. (It is noteworthy that the size of each of terminals 933a–933f and their interspacing may be different from terminals 33a–33d to implement the present scheme. However, based on the disclosure heretofore, a person skilled in the art should be readily able to select the suitable sizes and interspacing of those terminals for his/her particular applications.) Similarly, when another label 15 having terminals 933a' through 933d' is placed within slot 4, only its terminal 933d' can come into electrical contact with line 21 through metallic contact 99, resulting in generation of the bit pattern of 000100 by the label. It should be pointed out at this juncture that the slots on rail 9 need not be uniform in length and, in fact, their individual lengths may vary with the sizes of goods displayed within the respective slots.

With the arrangement described in FIG. 9, if a label is relocated from its supposed slot to any other slot, computer 11 would recognize such relocation during its periodic polling of the labels. Specifically, in this case computer 11 contains a look-up table listing the label addresses each associated with a different slot number identified by a 6-bit pattern. In addition, the look-up table includes the location information of each slot with respect to a reference point on the rail. In the event that, during a poll, a label reports to computer 11 a 6-bit pattern other than the one which is supposed to be associated with that label, computer 11 will assume that the label has been relocated. Accordingly, computer 11 may, again, issue a warning command to the label, causing its LED to flash so as to alert the store personnel to correct the unwanted relocation. Alternatively, it may generate an exception report identifying the relocated label, and the number and/or location of the slot which it is in based on the received 6-bit pattern.

Figure 10:
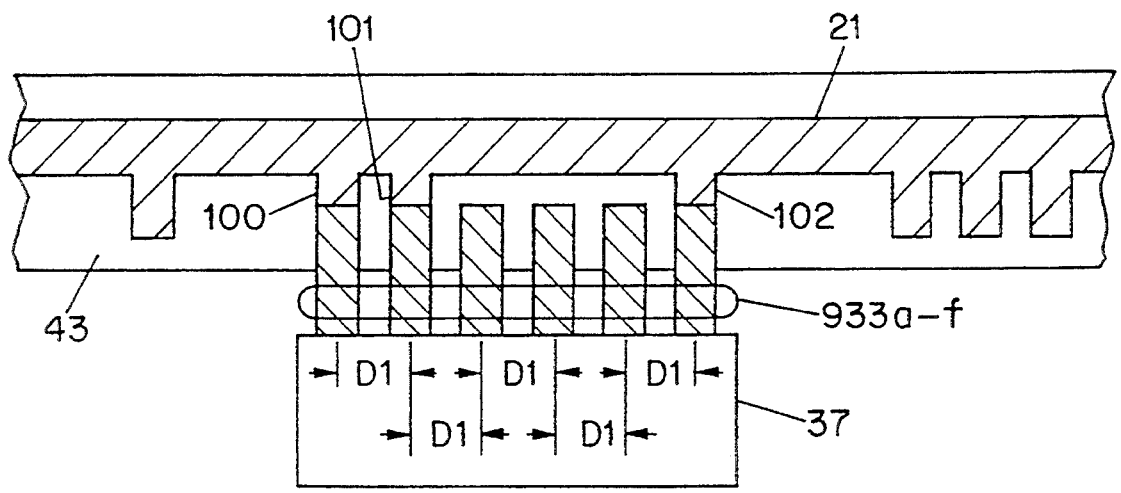
FIG. 10 illustrates a third rail arrangement in accordance with the invention wherein electrical contacts of the bus interface are separated by distances which are integer multiples of a predetermined distance.
Figure 11:
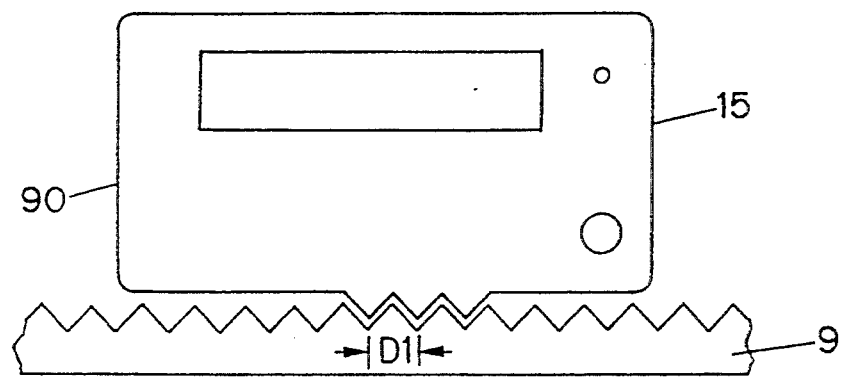
FIG. 11 shows a particular manner in which a label and the rail of the system of FIG. 1 are mechanically engaged with each other in implementing the third rail arrangement of FIG. 10.

A third embodiment involving a different design of line 21 will now be described. In this embodiment, again, only one side of board 43 has thereon a metallic strip of a particular pattern and is conductive, and label 15 has six terminals 933a through 933f extending from connector 37. However, the width the electrical contacts of line 21 is substantially identical to that of terminals 933a–933f of label 15. In addition, these electrical contacts are separated from one another by distances which are integer multiples of D1, which is the distance between two neighboring terminals of label 15. FIG. 10 shows a section of rail 9 which implements this scheme. As shown in FIG. 10, contact 100 and contact 101 is separated by D1, and contact 102 and contact 100 is separated by 5 D1. In accordance with the invention, the labels and the rail is so designed that each label can only move along the rail by multiple increments of D1. This may be achieved by various mechanical means and one such mechanical means is illustrated in FIG. 11. As shown in FIG. 11, case 90 of label 15 is machined to have, on its bottom, angular ridges for engagement with similar machined ridges on the bottom surface of rail 9. In this particular embodiment, the ridges on either case 90 or the rail surface are identical in size, and any two neighboring ridges are separated by D1. Referring back to FIG. 10, line 21 is aligned with terminals 933a–933f of label 15 so that if any terminal comes in touch with an electrical contact on line 21, the terminal and the electrical contact will substantially coincide with each other.

In this particular embodiment, there are 63 distinct positions defined by the combinations of presence and absence of electrical contacts on line 21. Each position assumed by label 15 causes the latter to generate a different one of the 6-bit patterns 000001 though 111111. In other words, each position is associated with a different 6-bit pattern. In this case computer 11 contains a look-up table listing individual label addresses each associated with a different position uniquely identified by a 6-bit pattern. The look-up table also includes information on the locations of these distinct positions with respect to a reference point on the rail. In the event that, during a periodic poll by computer 11, label 15 reports to the computer its address and a 6-bit pattern different from the one that is supposed to be associated with that address, computer 11 will assume that label 15 has been displaced. Accordingly, computer 11 may, once again, issue a warning command to label 15. Alternatively, it may generate an exception report identifying label 15, and its current position based on the received 6-bit pattern.

The foregoing merely illustrates the principles of the invention and those skilled in the art will be able to devise numerous arrangements which, although not explicitly shown or described herein, embody the principles of the invention.

For example, it is appreciated that those skilled in the art may combine different techniques as set forth above to suit their particular applications. For instance, the arrangement in the third embodiment described in FIG. 10 may be implemented in conjunction with the partitioning technique as disclosed in the second embodiment where rail 9 is mechanically divided into a plurality of slots and only one label can be placed in each slot.

Moreover, although in each illustrative embodiment label 15 conveniently obtains its power from power line 21 through one or more of its terminals 33a–33d or 933a–933f, the latter need not be so required to perform the dual function of relaying the power as well as locating the label. Rather, label 15 may obtain its power from another means which does not involve any of terminals 33a–33d or 933a–933f. In that case, since the terminals are solely used for label locating purposes, the requirement that at least one of those terminals be in electrical contact with line 21 will no longer be necessary. Thus, without affecting its power supply, label 15 may be programmed to generate the bit pattern of all zeros corresponding to the position or zone on rail 9 where none of terminals 33a–33d or 933a–933f makes electrical contact with line 21. Furthermore, having removed the power relaying function from terminals 33a–33d or 933a–933f, those skilled in the art may freely devise other arrangements having those terminals electrically connected to other wires than line 21. For instance, ground wire 31 may be realized on a printed circuit board which is etched to obtain patterns similar to those of line 21 as described hereinbefore. A selected number of terminals 33a–33d or 933a–933f make electrical contact with ground wire 31, as opposed to any power line, to realize distinct positions as the terminals move along rail 9. In that instance, label 15 may be programmed to generate a binary bit 0 when a terminal makes electrical contact with the ground wire and otherwise a binary bit 1. This being so, label 15 may also generate the bit pattern all zeros corresponding to the position or zone on rail 9 where all of terminals 33a–33d or 933a–933f make electrical contact with ground wire 31.

Finally, the invention is disclosed herein in a form in which the various functions of system 10 are performed by discrete functional blocks. However, any one or more of these functions could equally well be performed by one or more appropriately programmed microprocessors, microcoded integrated circuits, application-specific integrated circuits, and so on.

We claim:

1. A rail for detecting location of a display device having a plurality of terminals, said rail comprising:
    mechanical means for mounting said device on said rail;
    an interface having a plurality of electrical contacts for electrically connecting a combination of said terminals to said interface, said electrical contacts being unevenly spaced so that said combination of said terminals changes when said device displaces by more than a predetermined distance along said rail; and
    means for transporting a signal indicative of said combination of said terminals electrically connected to said interface, said signal being generated by said device.

2. The apparatus of claim 1 wherein said interface includes means for providing an electrical voltage and said combination of said terminals are electrically connected to the providing means.

3. The apparatus of claim 1 wherein said interface includes means for providing an electrical ground and said combination of said terminals are electrically connected to the providing means.

4. The apparatus of claim 1 wherein at least two of said plurality of electrical contacts are different in size.

5. The apparatus of claim 1 wherein said rail further comprises mechanical means for partitioning said rail into a plurality of slots, said device being mounted within a particular slot, said combination of said terminals being different from another combination of said terminals electrically connected to said interface when said device is mounted within a slot other than said particular slot.

6. The apparatus of claim 5 wherein said plurality of slots are identical in length.

7. The apparatus of claim 1 wherein said terminals are evenly spaced, any two neighboring terminals on said device being separated by a first distance, and individual pairs of neighboring electrical contacts on said interface being separated by distances which are integer multiples of said first distance.

8. The apparatus of claim 7 wherein said mechanical means includes means for mechanically engaging said device with said rail in such a manner that said device can only displace on said rail by distances which are integer multiples of said first distance.

9. The apparatus of claim 7 wherein said rail further comprises mechanical means for partitioning said rail into a plurality of slots, said device being mounted within a particular slot, said combination of said terminals being different from another combination of said terminals electrically connected to said interface when said device is mounted within a slot other than said particular slot.

10. The apparatus of claim 9 wherein said plurality of slots are identical in length.

11. The apparatus of claim 1 wherein each terminal includes means for mechanically clasping onto said interface.

12. A display device comprising:
    mechanical means for mounting said device on a rail, which rail includes an interface having a plurality of unevenly spaced electrical contacts;
    a plurality of terminals, a combination of said terminals electrically connecting said device to one or more of said electrical contacts of said interface; and means for generating a signal indicative of said combination of terminals electrically connected to said interface.

13. The device of claim 12 wherein said interface includes means for providing an electrical voltage and said combination of terminals are electrically connected to the providing means.

14. The device of claim 12 wherein said interface includes means for providing an electrical ground and said combination of terminals are electrically connected to the providing means.

15. The device of claim 12 wherein said terminals are evenly spaced.

16. The device of claim 15 wherein any two neighboring terminals are separated by a predetermined distance and said mechanical means includes means for mechanically engaging said device with said rail in such a manner that said device can only displace on said rail by distances which are integer multiples of said predetermined distance.

17. The device of claim 12 wherein each terminal includes means for mechanically clasping onto said interface.

18. An arrangement comprising:
a rail including an interface having a plurality of electrical contacts;
at least one display device, each display device comprising:
mechanical means for mounting said device on said rail;
a plurality of terminals, a combination of said terminals electrically connecting said device to one or more of said electrical contacts of said interface, said electrical contacts being unevenly spaced so that said combination of said terminals electrically connecting said device to said interface changes when said device displaces by more than a predetermined distance along said rail; and
means for generating a signal indicative of said combination of said terminals electrically connected to said interface.

19. The arrangement of claim 18 wherein said interface includes means for providing an electrical voltage and said combination of said terminals are electrically connected to the providing means.

20. The arrangement of claim 18 wherein said interface includes means for providing an electrical ground and said combination of said terminals are electrically connected to the providing means.

21. The arrangement of claim 18 wherein said rail includes means for transporting said signal.

22. The arrangement of claim 18 wherein at least two of said plurality of electrical contacts are different in size.

23. The arrangement of claim 18 wherein said rail further comprises mechanical means for partitioning said rail into a plurality of slots, said device being mounted within a particular slot, said combination of said terminals being different from another combination of said terminals electrically connected to said interface when said device is mounted within a slot other than said particular slot.

24. The arrangement of claim 23 wherein said plurality of slots are identical in length.

25. The arrangement of claim 18 wherein said terminals are evenly spaced, any two neighboring terminals on said device being separated by a first distance, and individual pairs of neighboring electrical contacts on said interface being separated by distances which are integer multiples of said first distance.

26. The arrangement of claim 25 wherein said mechanical means includes means for mechanically engaging said device with said rail in such a manner that said device can only displace on said rail by distances which are integer multiples of said first distance.

27. The arrangement of claim 25 wherein said rail further comprises mechanical means for partitioning said rail into a plurality of slots, said price display device being mounted within a particular slot, said combination of said terminals being different from another combination of said terminals electrically connected to said interface when said device is mounted within a slot other than said particular slot.

28. The arrangement of claim 27 wherein said plurality of slots are identical in length.

29. The arrangement of claim 18 wherein each terminal includes means for mechanically clasping onto said interface.

30. A method for use with a display device comprising a plurality of terminals, said method comprising the steps of:
mounting said device on a rail which includes an interface having a plurality of unevenly spaced electrical contacts;
electrically connecting said device to one or more of said electrical contacts of said interface through a combination of said terminals; and
generating a signal by said device indicative of said combination of terminals electrically connected to said interface.

31. The method of claim 30 further comprising the step of partitioning said rail into a plurality of slots, said display device being mounted within a particular slot, said combination of said terminals being different from another combination of said terminals electrically connected to said interface when said device is mounted within a slot other than said particular slot.

32. The method of claim 30 wherein said terminals are evenly spaced, any two neighboring terminals on said device being separated by a first distance, said mounting step including the step of mechanically engaging said device with said rail in such a manner that said device can only displace on said rail by distances which are integer multiples of said first distance.

* * * * *